US008730965B2

(12) United States Patent
Abts et al.

(10) Patent No.: US 8,730,965 B2
(45) Date of Patent: May 20, 2014

(54) SYSTEMS AND METHODS FOR DYNAMIC ROUTING IN A MULTIPROCESSOR NETWORK USING LOCAL CONGESTION SENSING

(75) Inventors: Dennis Charles Abts, Eleva, WI (US); Peter Michael Klausler, Middleton, WI (US); Michael Marty, Madison, WI (US); Philip Wells, Madison, WI (US)

(73) Assignee: Google Inc., Mountain View, CA (US)

( * ) Notice: Subject to any disclaimer, the term of this patent is extended or adjusted under 35 U.S.C. 154(b) by 422 days.

(21) Appl. No.: 12/985,013

(22) Filed: Jan. 5, 2011

(65) Prior Publication Data
US 2012/0170582 A1   Jul. 5, 2012

(51) Int. Cl.
*H04L 12/28* (2006.01)
*H04L 12/56* (2006.01)

(52) U.S. Cl.
USPC ............... 370/392; 370/395.31; 370/419

(58) Field of Classification Search
USPC ............ 370/229, 389, 392, 395.3, 395.31, 370/395.32, 419
See application file for complete search history.

(56) References Cited

U.S. PATENT DOCUMENTS

| 7,697,517 | B2 | 4/2010 | Yazaki et al. | |
|---|---|---|---|---|
| 7,852,836 | B2 | 12/2010 | Scott et al. | |
| 7,899,916 | B1* | 3/2011 | Bumstead et al. | 709/228 |
| 8,085,794 | B1* | 12/2011 | Niver et al. | 370/401 |
| 2002/0156918 | A1* | 10/2002 | Valdevit et al. | 709/238 |
| 2003/0090997 | A1* | 5/2003 | Lindstrom | 370/228 |
| 2004/0095922 | A1* | 5/2004 | Sasagawa | 370/351 |
| 2004/0100944 | A1* | 5/2004 | Richmond et al. | 370/360 |
| 2005/0078603 | A1* | 4/2005 | Turner et al. | 370/235 |
| 2006/0209688 | A1* | 9/2006 | Tsuge et al. | 370/229 |
| 2010/0278180 | A1 | 11/2010 | Ma | |
| 2012/0054427 | A1* | 3/2012 | Huang et al. | 711/108 |
| 2012/0144065 | A1* | 6/2012 | Parker et al. | 709/241 |
| 2012/0207172 | A1* | 8/2012 | Emmanuel | 370/400 |

OTHER PUBLICATIONS

International Search Report and Written Opinion for PCT/US2012/020157, dated Aug. 20, 2012.
InfiniScale® IV, 4th Generation InfiniBand Switch Architecture, 2 pages, www.mellanox.com, © 2009.
Kim et al., "Adaptive Routing in High-Radix Clos Network," IEEE, Nov. 2006, 11 pp.
Anderson et al., "Performance of the CRAY Multiprocessor," ACM, 1997, 17 pp.
Kim et al., "Flattened Butterfly: A Cost Efficient Topology for High-Radix Networks," ISCA, Jun. 9-13, 2007, 12 pp.
Gran et al., "First Experiences with Congestion Control in InfiniBand Hardware," IEEE, 2010, 12 pp.

* cited by examiner

*Primary Examiner* — Ayaz Sheikh
*Assistant Examiner* — Hoang-Chuong Vu
(74) *Attorney, Agent, or Firm* — Lerner, David, Littenberg, Krumholz & Mentlik, LLP

(57) ABSTRACT

Adaptive packet routing is employed in a multiprocessor network configuration such as an InfiniBand switch architecture. Packets are routed from host to host through one or more switches. Upon receipt of a packet at a switch, the packet header is inspected to determine the destination host. A destination field in the header is used to index into a lookup table or other memory, which produces a route type and an output port grouping. Depending on the route type, one or more primary and secondary output port candidates are identified. An output port arbitration module chooses an output port from which to send a given packet, using congestion sensing inputs for the specified ports. A heuristic may include the congestion information that is provided to the arbitration module. Switching may be performed among minimal or non-minimal routes along each hop in the path, depending upon link and packet injection information.

18 Claims, 3 Drawing Sheets

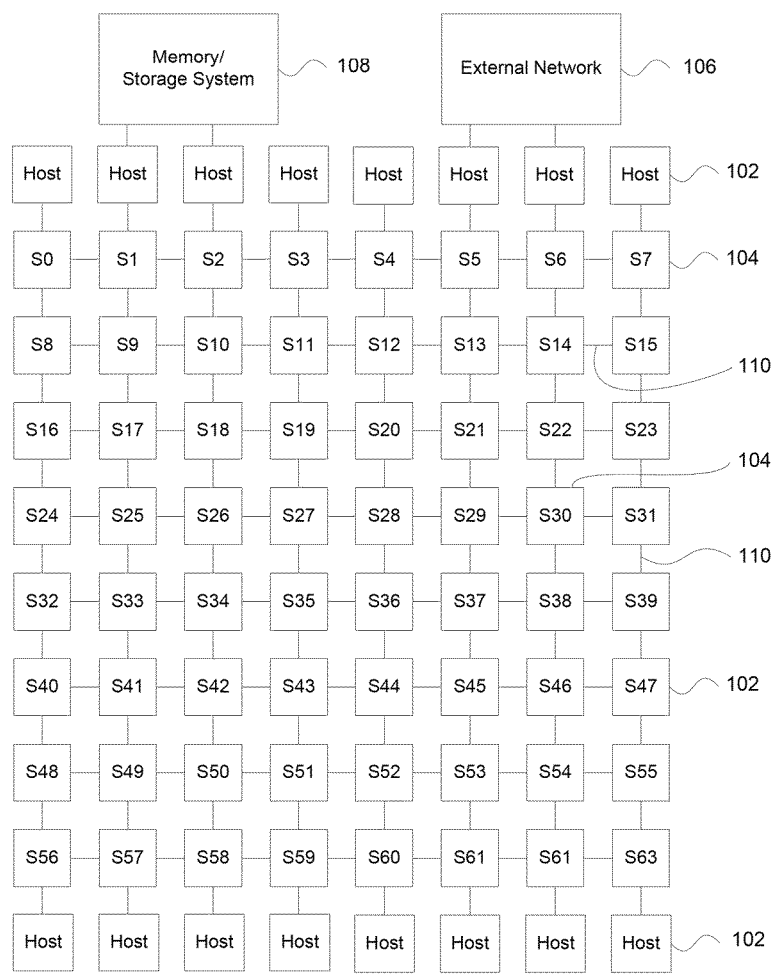

SYSTEMS AND METHODS FOR DYNAMIC ROUTING IN A MULTIPROCESSOR NETWORK USING LOCAL CONGESTION SENSING

BACKGROUND OF THE INVENTION

1. Field of the Invention

The present invention is generally related to multiprocessor networks. More particularly, the present invention is directed to adaptive packet routing among switches and endpoints in a cluster-type interconnection network.

2. Description of Related Art

Large scale computing systems such as cluster computers support a wide variety of applications and services. Such systems may include multiple devices distributed across an interconnection network/switch fabric. Each node of the network may include a switch (e.g., a router) or an endpoint (e.g., a host device). Typically, a routing algorithm is used to determine the path through the network between each pair of source and destination devices.

The routing algorithm may be implemented by programming a lookup table ("LUT") in each switch (router) chip in the network. For instance, the LUT is indexed by the destination address and produces an output port based on the contents programmed in the LUT. By taking into account a congestive state of the network, the routing algorithm decides which path (output port) is the "best" choice based on a heuristic. The goal of the routing algorithm is to evenly use the available links, or "load balance" the network, by spreading the offered traffic across as many links possible while still providing deadlock-free operation.

The interconnection network may be arranged in different configurations (topologies). For instance, an array of devices may be configured in a mesh, torus, flattened butterfly or generalized hypercube architecture. In one architecture, switching chips are used to build fat-trees of folded-Clos networks. In this architecture, a packet can take one of several paths as it traverses from the source (injection) host to the common ancestor at the root of the tree. Here, adaptive routing helps to load balance the available paths in the network by evenly distributing the offered load across the available physical channels. Alternative topologies, such as the flattened butterfly and generalized hypercube, are direct networks that require adaptive routing to load balance the links and provide good latency-bandwidth characteristics for arbitrary traffic.

SUMMARY OF THE INVENTION

Aspects of the invention provide mechanisms to assert adaptive (dynamic) routes in cluster-type interconnection networks/switch fabrics. In one embodiment, each destination address is mapped to an arbitrary output port set. Both primary and secondary port sets are specified. Desirably, the secondary port set is used only if the output ports in the primary set are congested. Adaptive routing (dynamic load balancing) according to aspects of the invention employs one or more heuristics to select the most appropriate output port (path) to use.

In accordance with one embodiment of the invention, a method of routing data packets in an interconnection network is provided. The method comprising receiving a data packet on an input port of a routing device in the interconnection network; inspecting a destination field of a packet header of the data packet to determine a destination host; using the destination field to index into memory; generating a first field and a second field using the memory, the first field being a route type and the second field being an output port grouping, the output port grouping identifying a plurality of output port candidates; arbitrating among the plurality of output port candidates using the route type and heuristic information to select one of the plurality of output port candidates; and routing the data packet using the selected output port candidate. The output port grouping includes a first grouping representing a primary set of output port candidates from the plurality of output port candidates, and a second grouping representing a secondary set of output port candidates from the plurality of output port candidates.

In one example, if the primary set of output port candidates is congested, then the secondary set of output port candidates is used to determine the selected output port candidate. In another example, the output port grouping is split into two fields. The first field includes the first grouping and the second field includes the second grouping.

In a further example, the route type is one of a random route type, an adaptive route type and a deterministic route type. In one alternative, if the route type is the random route type, arbitrating among the plurality of output port candidates including pseudo-randomly choosing from among the primary or secondary sets of output port candidates. In another alternative, if the route type is the adaptive route type, arbitrating among the plurality of output port candidates includes using congestion sensing inputs for the primary and secondary sets of output port candidates to perform the selection. In this case, if the primary set of output port candidates are congested, then the secondary set of output port candidates is used to determine the selected output port candidate. In a further alternative, if the route type is the deterministic route type, arbitrating among the plurality of output port candidates includes choosing a first valid output port of the primary set of output port candidates as the selected output port candidate.

In another example, the heuristic information is a congestion sensing heuristic that includes at least one of channel utilization and output queue depth. In a further example, the heuristic information is a congestion sensing heuristic that includes a rate of credit return.

In an alternative, the arbitration is performed to achieve minimal routing for a current hop in transmission of the data packet. In another alternative, the arbitration is performed to achieve non-minimal routing for a current hop in transmission of the data packet if there is a faulty link in the interconnection network, or if the data packet was injected at least two hops from its destination such that there is a choice among possible output ports. And in a further alternative, one or more additional fields are used in conjunction with the destination field to index into the memory. The additional fields include at least one of a source address, a hop limit, a time to live, and a packet length.

In accordance with another embodiment, a device is provided. The device comprises an input port, memory and a processor. The input port is adapted for coupling to one or more output ports of routing devices in an interconnection network. The input port is configured to receive a data packet from the one or more output ports. The memory is adapted to store information regarding the data packet. The processor is coupled to the input port and the memory, and is configured to inspect a destination field of a packet header of the data packet to determine a destination host, to use the destination field to index into the memory, to generate a first field and a second field using the memory, the first field being a route type and the second field being an output port grouping, the output port grouping identifying a plurality of output port candidates, to arbitrate among the plurality of output port candidates using the route type and heuristic information to select one of the plurality of output port candidates, and to route the data packet using the selected output port candidate. The output port grouping includes a first grouping representing a primary set of output port candidates from the plurality of output port candidates, and a second grouping representing a secondary set of output port candidates from the plurality of output port candidates.

In one example, the processor employs an arbitration module to arbitrate among the plurality of output port candidates. In another example, the memory is a lookup table. In a further example, the memory is a content addressable memory.

In one alternative, if the route type is a random route type, the arbitration includes pseudo-randomly choosing from among the primary or secondary sets of output port candidates. In another alternative, if the route type is an adaptive route type, the arbitration includes using congestion sensing inputs for the primary and secondary sets of output port candidates to perform the selection. And in a further alternative, if the route type is a deterministic route type, the arbitration includes choosing a first valid output port of the primary set of output port candidates as the selected output port candidate.

According to a further embodiment, a system including a plurality of routing devices for an interconnection network is provided. Each routing device comprises one or more input ports, memory and a processor. The input ports are adapted for coupling to one or more output ports of routing devices in an interconnection network. The input ports are configured to receive data packet from the one or more output ports. The memory is operable to store information regarding the data packets. And the processor is coupled to the one or more input ports and the memory. The processor is configured to inspect a destination field of a packet header of each data packet to determine a destination host, to use the destination field to index into the memory, to generate a first field and a second field using the memory, the first field being a route type and the second field being an output port grouping, the output port grouping identifying a plurality of output port candidates, to arbitrate among the plurality of output port candidates using the route type and heuristic information to select one of the plurality of output port candidates for each respective data packet, and to route the respective data packets using the selected output port candidates. The output port grouping includes a first grouping representing a primary set of output port candidates from the plurality of output port candidates, and a second grouping representing a secondary set of output port candidates from the plurality of output port candidates.

BRIEF DESCRIPTION OF THE DRAWINGS

FIG. 1 illustrates an exemplary interconnection network architecture.

DETAILED DESCRIPTION

Figure 2A:
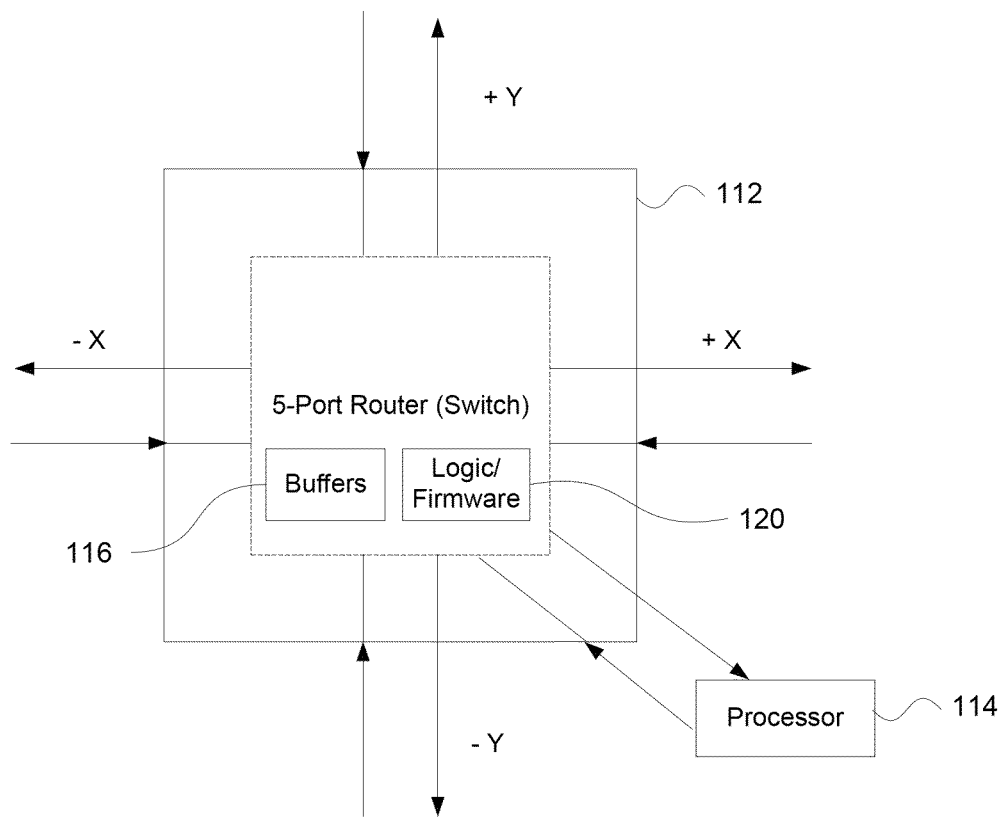
FIGS. 2A-B illustrate an exemplary router (switch) for use with aspects of the invention.

The aspects, features and advantages of the present invention will be appreciated when considered with reference to the following description of embodiments and accompanying figures. The same reference numbers in different drawings may identify the same or similar elements. Furthermore, the following description does not limit the present invention; rather, the scope of the invention is defined by the appended claims and equivalents.

FIG. 1 illustrates an exemplary interconnection network architecture (switch fabric) 100 for use with aspects of the invention. As shown, the architecture includes a number of hosts 102, which may be computers such as servers or client devices. The hosts 102 may be coupled to one another through nodes 104 in the network architecture. The hosts 102 may also be coupled to an external network 106, to a storage system 108, or to other devices (not shown).

In this example, the network architecture 100 includes a plurality of nodes 104. Each node 104 desirably includes a switch (router), such as switches S0 . . . S63. As shown, the switches are arranged in a mesh-type configuration, although the invention is not constrained to any particular switch interconnection configuration. Adjacent nodes 104 are connected to one another via links 110. For instance, processor S9 is connected to processors S1, S8, S10 and S17.

FIG. 2A illustrates that each node 104 may include a multi-port router (switch) 112. An exemplary 5-port router is shown, although each device may include more or less ports. In the configuration shown, four input and output port pairs connect to adjacent nodes in the +X, −X, +Y and −Y directions of the network architecture 100, and communicate via respective links 110. Each link 110 desirably includes an input port and an output port. The switch may connect to a processor 114 co-located at the switch's respective node.

Figure 2B:
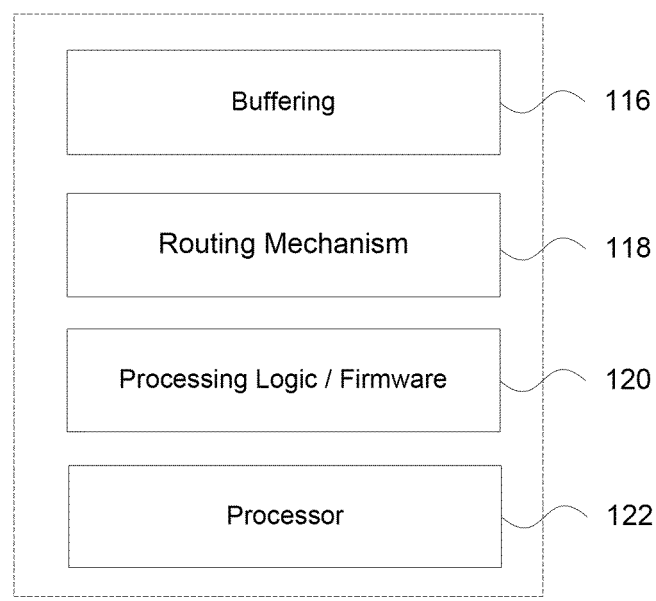

The router 112 may include buffering (memory) 116 and a routing mechanism 118 for routing data packets to other nodes and hosts. This is also shown in FIG. 2B. The buffering 116 desirably includes input buffers for received packets and output buffers for packets to be transmitted. Each port, whether input or output, may have a buffer associated with it. The router 112 also includes processing logic or firmware 120 for determining which path(s) to route packets along. This avoids undesirable situations such as routing deadlock and provides load balancing, as discussed herein. A processor 122 manages the processing logic/firmware 120.

Figure 3:
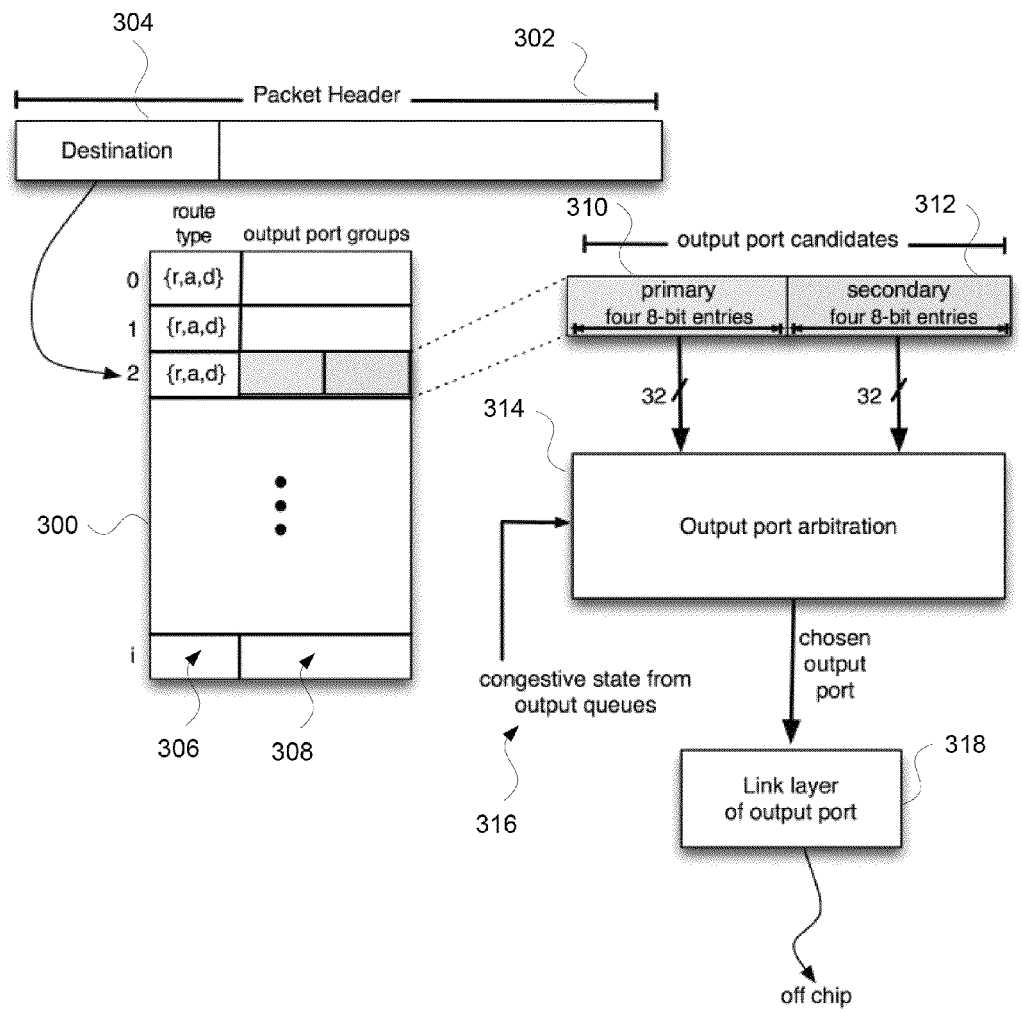
FIG. 3 illustrates dynamic routing features in accordance with aspects of the invention.

In accordance with one aspect of the invention, the processing logic/firmware 120 desirably includes a lookup table memory 300 as shown in FIG. 3. In this example, a single specific lookup table format (two four-entry port number tables) is described. In different examples, other table configurations such as a pair of n-entry port number tables, a pair of bit-sets, or a hierarchy of any of these with more than two levels, may be used. Another variant would be to not explicitly represent the primary (or higher-priority) port sets within the secondary (or lower-priority) port sets. Instead, each port set level may implicitly include all the previous ones and only identify the new ports to be considered when all the previous levels' ports are congested. In an alternative, other memory solutions 300 may be employed instead of a lookup table. For instance, content addressable memory ("CAM") such as ternary content addressable memory ("TCAM") may be used, e.g., as part of an Ethernet chip.

Packets arrive from either a host or an adjacent switch (router) chip at a given input port. The arriving packets are stored in the input buffer of the given input port. Upon receipt, the packet header 302 is inspected by the processor 122, using the processing logic 120 to determine the destination host. The destination field 304 of the packet header is used to index into lookup table, TCAM or other memory 300. One or more other fields of the packet header may also be used in addition to the destination field 304. Depending on the type of header, the other fields may include the source address, hop limit, time to live, packet length, etc. The lookup table 300 produces two fields. The first field is a route type 306. The second field is an output port grouping 308.

The route type 306 may be identified as one of random ("r"), adaptive ("a"), or deterministic ("d"). The route type may be determined, by way of example, by either an opcode from a packet header, or it may be explicitly set in the packet header as a separate field. The output port grouping 308 is desirably represented as a 64-bit value split into two 32-bit fields, namely fields 310 and 312. The two fields represent primary (310) and secondary (312) sets of output port groups, respectively. As shown, the primary and secondary sets of port candidates may each include four 8-bit entries, although different numbers of candidates, and different bit lengths, may be employed.

An arbitration module 314 may function as processing logic or firmware (e.g., 120 in FIGS. 2A-B), which is desirably implemented by a processor executing instructions. The processor may be the processor 122. The instructions may be any set of instructions or programs to be executed directly (such as machine code) or indirectly (such as scripts) by the processor. For example, the instructions may be stored as computer code on a tangible computer-readable medium associated with the processor. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The processor may be any conventional processor, such as processors from Intel Corporation or Advanced Micro Devices. Alternatively, the processor may be a dedicated controller such as an ASIC. Although the processor and memory for the arbitration module may be physically within the same block of a computer chip, it should be understood that the processor and memory may actually comprise multiple processors and memories that may or may not be stored on the same chip or within the same physical housing. Accordingly, references to a processor or memory will be understood to include references to a collection of processors or memories that may or may not operate in parallel.

For random traffic (route type r), the output port arbitration module 314 chooses a port pseudo-randomly among the output ports specified in the primary or secondary groups. The pseudo-random port selection may use a free-running number (seed) to identify which port to use. The seed may be pre-programmed prior to starting the pseudo-random number generator for reproducible results (program debugging, troubleshooting, etc). One approach is to use a linear feedback shift register ("LFSR") to indicate the random number.

With adaptive routing (route type a), the output port arbitration module 314 uses congestion sensing inputs from the output ports specified by the lookup table (or TCAM or other memory) 300. Thus, in the present example, the output arbitration analyzes 8 output ports from the lookup table 300. If the primary output ports are congested, then the secondary output port group is used to determine a winner. Finally, the deterministic mode (route type d) allows a specific (static) path to be followed. In this case, the first valid output port specified in the primary output port group is selected for use by the arbitration module 314 as the output port.

Channel utilization, output queue depth, rate of credit return, etc., are suitable proxies for channel load and may be used by the arbitration module 314 to make an informed decision about which of the output ports represents the "best" choice. The rate of credit return identifies how quickly a downstream input buffer handles requests. A flow control packet or bits are used to identify what the downstream buffer can handle. The flow control may be relative or absolute.

As shown in FIG. 3, a heuristic 316 which may include such congestive state information is provided to the arbitration module 314, along with the output port candidates from the lookup table (or TCAM or other memory) 300. Once the appropriate output port has been selected by the arbitration module 314 in view of the heuristic, such information is sent to a link layer module 318 of the selected output port. The link layer module 318 uses this information to route the packet on to the next switch (router) or host device (endpoint).

As indicated above, the heuristic is used as an input to the arbitration module to guide the output port selection process. The congestive state of a given output port can be expressed as a fraction between 0 and 1 (or as a percentage between 0% and 100%), indicating the channel utilization within some epoch. The utilization gives an aggregate sense of how "busy" the channel for that output port is., for instance within the past N arbitration cycles, where N is some predetermined number of cycles. Alternatively, the number of entries in the output queue (sometimes referred to as the "transmission queue") provides a proxy for the downstream congestion in the path.

The lookup table (or TCAM or other memory) 300 desirably provides four primary entries (output port candidates 310) and four secondary entries (output port candidates 312). Each entry may comprise an 8-bit value, with the most significant bit indicating if the entry is valid and should be considered in the output arbitration. This is because there may not always be four valid output ports based on possible deadlock avoidance turn restrictions. The low-order 7-bits of each entry indicate a port number which is to be considered for output arbitration. This allows for a switch with degree up to 128 (total of 128 input/output ports). The secondary entries provide an alternative set of output ports (which may be an overlapping set with primary outputs).

While FIG. 3 illustrates a particular lookup table configuration, other designs may be used in accordance with aspects of the invention. For instance, a pair of n-entry port number tables with n≠4 may be employed. In other examples, a pair of bit-sets, or a hierarchy of any of these with more than two levels, may be used. Another variation is to not explicitly represent the primary (or higher priority) port sets within the secondary (or lower-priority) port sets. Instead, each level of port set may implicitly include all the previous ones, and only need to identify the new ports to be considered when all the previous levels' ports are congested. And as discussed above, TCAM or another type of memory may be used in lieu of a lookup table.

According to aspects of the invention, switching is performed among minimal and non-minimal routes along each hop in the path. Desirably, minimal routing is employed unless a non-minimal route is required for either a faulty link in the network, or the packet was injected at least two hops from its destination such that there is a choice among possible output ports. In the former case, as the packet nears the destination, the possible set of valid output ports over which to adapt diminishes. Here, if a fault occurs in the next-to-last hop, then the packet is take an extra (non-minimal) hop to skirt around the faulty link. In the latter case, the packet is being injected from a host which is two hops away from the destination; this is a fingerprint for "antagonistic" traffic which must use non-minimal routing to spread the traffic over the available links. As used herein, antagonistic traffic includes worst-case traffic, such as a communication pattern that performs poorly on the given topology.

In an alternative, the switch fabric may include one or more of the following features, which may be used with an InfiniBand switching fabric architecture or other interconnection architecture. In one aspect, linear forwarding tables may be associated with each input port. Employing a lookup table, TCAM or other memory/storage for each input port allows for flexible routing in addition to sufficient lookup table bandwidth for short messages. Short messages will put pressure on the routing pipeline (resource hazard) if it is shared by multiple ports and not enough read ports. In one example, it is acceptable to have between four to six private linear forwarding tables which may be used to represent ingress ports, egress ports, and incoming ports from different "directions" (such as in a k-ary n-cube). In another example, it is desirable to include a mechanism for including input virtual lanes in the output port calculation. In one scenario, this could mean, for example, that given an input port, one set of input virtual lanes uses one private linear forwarding table, and another set of virtual lanes goes to a different linear forwarding table.

In another aspect, the switch fabric permits flexible control of the output virtual lanes among the network nodes. For instance, it is desirable to consider the input virtual lane when choosing the output virtual lane. While a service level to virtual lane mapping table provides a mechanism to accomplish this for a single switch traversal, the result will be undone on the next hop as the service level in the packet is invariant. Thus, in one alternative, it is desirable to provide a mechanism for including the input virtual lane into the route computation to select the output virtual lane.

One possibility is to extend the definition of the service level to virtual lane mapping table so that after its, e.g., 16 4-bit entries that are indexed by the service level, there may be a new table of e.g., 15 8-bit entries indexed by the input virtual lane. Each byte desirably includes a flag in its upper four bits and an output virtual lane number in its lower-order four bits. In one example, a logical "0" indicates to ignore this new table entry and instead to use the service level to virtual lane mappings as defined in the InfiniBand specification. Alternatively a logical "1" is used to indicate to map the input virtual lane to the specific output virtual lane in the lower-order bits.

A variation is to optionally increment the current virtual lane, namely the virtual lane on which the packet arrived. This may be done with an additional bit in the linear forwarding table to indicate whether the virtual lane remains unchanged (0) or gets incremented (1).

In some architectures, adaptive routing permits a port to be a member of at most eight port groups, and each of these port group tables must contain disjoint entries. The encoding and limited number of group tables constrains adaptive port candidates as system scale increases. The encoding of the output port sets in port group table schemes may be problematic in such architectures. Adding more tables does not solve the problem for a large (e.g., O(20K)) cluster. In addition, encoding of the adaptive routing unicast linear forwarding table in such architectures may impose a limit of 64 tables. While this amount of tables may be sufficient in some situations, but it may not be sufficient if each table's groups are required to be pairwise disjoint.

One aspect addresses such issues by mapping each destination address to an arbitrary output port set. Desirably, two output port sets are allocated per route, corresponding to primary and secondary routes. In a preferred case, the ports specified in the secondary route are considered only if the destination ports specified in the primary set are congested (e.g., meet some threshold criteria).

A further alternative increases the Unicast local ID ("LID") space. The InfiniBand architecture allows for 16-bits of destination LID space, of which 48K are unicast LIDs specified using the linear forwarding table. By using path selection bits, multiple LIDs may alias to the same destination endpoint, selected by the upper-most bits of the LID. Each path selection bit will reduce the scale of the network by a factor of 2. So, for example, with four unique paths (using two path select bits), the maximum system size would be limited to 12K. It should be noted that each switch may requires a LID, so the actual scale of the system is effectively on the order of 10K endpoints. As an alternative, a large number of LIDs such as 48,000 LIDs may not be needed, if there another mechanism is employed to use several selection bits similar to a path select.

As indicated above, while an InfiniBand architecture may be employed, other switch fabrics may be used in accordance with the aspects of the invention. Preferably, the switch fabric is a lossless fabric that is enabled by credit-based flow control. For instance, adaptive routing features as discussed herein may be used in a cluster arrangement having Ethernet endpoints.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of routing data packets in an interconnection network, the method comprising:
   receiving a data packet on an input port of a routing device in the interconnection network;
   inspecting a destination field of a packet header of the data packet to determine a destination host;
   using the destination field to index into memory;
   generating a first field and a second field using the destination field indexed into the memory, the first field being a route type identifying a type of route for the data packet and the second field being an output port grouping, the output port grouping identifying a plurality of output port candidates;
   arbitrating among the plurality of output port candidates using the route type and heuristic information to select one of the plurality of output port candidates; and
   routing the data packet using the selected output port candidate;
   wherein the output port grouping includes a first grouping representing a primary set of output port candidates from the plurality of output port candidates, and a second grouping representing a secondary set of output port candidates from the plurality of output port candidates;
   wherein the route type is one of a random route type, an adaptive route type and a deterministic route type; and
   wherein if the route type is the random route type, arbitrating among the plurality of output port candidates including pseudo-randomly choosing from among the primary or secondary sets of output port candidates.

2. The method of claim 1, wherein if the primary set of output port candidates is congested, then the secondary set of output port candidates is used to determine the selected output port candidate.

3. The method of claim 1, wherein the output port grouping is split into two fields, the first field including the first grouping and the second field including the second grouping.

4. The method of claim 1, wherein if the route type is the adaptive route type, arbitrating among the plurality of output port candidates includes using congestion sensing inputs for the primary and secondary sets of output port candidates to perform the selection.

5. The method of claim 4, wherein if the primary set of output port candidates are congested, then the secondary set of output port candidates is used to determine the selected output port candidate.

6. The method of claim 1, wherein if the route type is the deterministic route type, arbitrating among the plurality of output port candidates includes choosing a first valid output port of the primary set of output port candidates as the selected output port candidate.

7. The method of claim 1, wherein the heuristic information is a congestion sensing heuristic that includes at least one of channel utilization and output queue depth.

8. The method of claim 1, wherein the heuristic information is a congestion sensing heuristic that includes a rate of credit return.

9. The method of claim 1, wherein the arbitration is performed to achieve minimal routing for a current hop in transmission of the data packet.

10. The method of claim 1, wherein the arbitration is performed to achieve non-minimal routing for a current hop in transmission of the data packet if there is a faulty link in the interconnection network, or if the data packet was injected at least two hops from its destination such that there is a choice among possible output ports.

11. The method of claim 1, wherein one or more additional fields are used in conjunction with the destination field to index into the memory, the additional fields including at least one of a source address, a hop limit, a time to live, and a packet length.

12. A device, comprising:
an input port adapted for coupling to one or more output ports of routing devices in an interconnection network, the input port being configured to receive a data packet from the one or more output ports;
memory for storing information regarding the data packet; and
a processor coupled to the input port and the memory, the processor being configured to:
inspect a destination field of a packet header of the data packet to determine a destination host,
use the destination field to index into the memory,
generate a first field and a second field using the destination field indexed into the memory, the first field being a route type identifying a type of route for the data packet and the second field being an output port grouping, the output port grouping identifying a plurality of output port candidates,
arbitrate among the plurality of output port candidates using the route type and heuristic information to select one of the plurality of output port candidates, and
route the data packet using the selected output port candidate;
wherein the output port grouping includes a first grouping representing a primary set of output port candidates from the plurality of output port candidates, and a second grouping representing a secondary set of output port candidates from the plurality of output port candidates;
wherein the route type is one of a random route type, an adaptive route type and a deterministic route type; and
wherein if the route type is the random route type, arbitrating among the plurality of output port candidates including pseudo-randomly choosing from among the primary or secondary sets of output port candidates.

13. The device of claim 12, wherein the processor employs an arbitration module to arbitrate among the plurality of output port candidates.

14. The device of claim 12, wherein the memory is a lookup table.

15. The device of claim 12, wherein the memory is a content addressable memory.

16. The device of claim 12, wherein if the route type is the adaptive route type, the arbitration includes using congestion sensing inputs for the primary and secondary sets of output port candidates to perform the selection.

17. The device of claim 12, wherein if the route type is the deterministic route type, the arbitration includes choosing a first valid output port of the primary set of output port candidates as the selected output port candidate.

18. A system including a plurality of routing devices for an interconnection network, each routing device comprising:
one or more input ports adapted for coupling to one or more output ports of routing devices in an interconnection network, the input ports being configured to receive data packet from the one or more output ports;
memory for storing information regarding the data packets; and
a processor coupled to the one or more input ports and the memory, the processor being configured to:
inspect a destination field of a packet header of each data packet to determine a destination host,
use the destination field to index into the memory,
generate a first field and a second field using the destination field indexed into the memory, the first field being a route type identifying a type of route for the data packet and the second field being an output port grouping, the output port grouping identifying a plurality of output port candidates,
arbitrate among the plurality of output port candidates using the route type and heuristic information to select one of the plurality of output port candidates for each respective data packet, and
route the respective data packets using the selected output port candidates;
wherein the output port grouping includes a first grouping representing a primary set of output port candidates from the plurality of output port candidates, and a second grouping representing a secondary set of output port candidates from the plurality of output port candidates;
wherein the route type is one of a random route type, an adaptive route type and a deterministic route type; and
wherein if the route type is the random route type, arbitrating among the plurality of output port candidates including pseudo-randomly choosing from among the primary or secondary sets of output port candidates.

* * * * *